(12) United States Patent
Wang

(10) Patent No.: US 7,380,933 B1
(45) Date of Patent: Jun. 3, 2008

(54) FIXING STRUCTURE FOR LENSES AND FRAME OF EYEGLASSES

(75) Inventor: Ching-Hsiang Wang, Tainan (TW)

(73) Assignee: Day Sun Industrial Corp., Tainan (TW)

( * ) Notice: Subject to any disclaimer, the term of this patent is extended or adjusted under 35 U.S.C. 154(b) by 0 days.

(21) Appl. No.: 11/744,921

(22) Filed: May 7, 2007

(51) Int. Cl.
  *G02C 1/00* (2006.01)
  *G02C 1/04* (2006.01)

(52) U.S. Cl. .............................. 351/86; 351/85; 351/87; 351/103; 351/106

(58) Field of Classification Search .................. 351/86, 351/83, 85, 87, 103, 106, 109, 104, 105, 351/41, 158
See application file for complete search history.

(56) References Cited

U.S. PATENT DOCUMENTS

| | | | | |
|---|---|---|---|---|
| 5,386,254 A | * | 1/1995 | Kahaney | 351/60 |
| 6,196,681 B1 | * | 3/2001 | Canavan | 351/106 |
| 6,386,704 B1 | * | 5/2002 | Wu | 351/106 |
| 7,150,525 B1 | * | 12/2006 | Yang | 351/86 |
| 7,219,993 B1 | * | 5/2007 | Chiou | 351/103 |

* cited by examiner

*Primary Examiner*—Hung X. Dang
(74) *Attorney, Agent, or Firm*—Alan Kamrath; Kamrath & Associates PA

(57) ABSTRACT

A fixing structure for lenses and a frame of eyeglasses is provided. A combining element integrally formed on a top of said styled lenses is concavely provided with a containing groove facing inwardly at a segment corresponding to styled lenses. Two sides of the containing grooves are provided with a wider distance at the outer end and narrow in toward the inner end. A hole is provided at a center and two sides on an upper flange of the combining element, respectively, so as to contain the strip on the two sides of the frame formed wider on the outer end and narrower on the inner end. The strip of the frame with the middle portion extended into a nose pad portion is provided with a protrusion corresponding to the hole opened on the combining element on top of the lenses, such that the two may be engaged together when assembled. A concave portion is provided at a bottom of a leg connecting element on the two sides of the frame, so as to support the two ends of the lenses when assembled.

1 Claim, 3 Drawing Sheets

US 7,380,933 B1

FIXING STRUCTURE FOR LENSES AND FRAME OF EYEGLASSES

FIELD OF THE INVENTION

The present invention provides a fixing structure for lenses and a frame of eyeglasses; particularly, the fixing structure is designed so that a combining element integrally formed on top of designed glasses and a frame with a middle portion integrally formed with a nose pad portion can be easily and quickly assembled and to achieve stability.

BACKGROUND OF THE INVENTION

Conventionally, eyeglasses are designed to be assembled with great variety to enhance an overall appearance and aesthetics when assembled. Additionally, eyeglasses are designed so that it can be easily disassembled when making additional process thereof. Therefore, a variety of assembly and implementation applied on the structure of the elements of the designed eyeglasses by related manufacturers has both advantages and disadvantages. Correspondingly, users can select particular eyeglasses in accordance with their needs.

SUMMARY OF THE INVENTION

The present invention provides an alternative to design an assembly structure of elements on conventional eyeglasses, such that the assembly of styled lenses and frame can be implemented by easy and fast containment and engagement to achieve stability in positioning the elements. Additionally, the present invention is designed such that disassembly in the future can be easily accomplished.

One object of the present invention is to provide a containing groove facing inwardly at a portion corresponding to a combining element integrally formed on top of styled lenses. The containing groove at the two sides is wider in distance at the outer end and narrower at the inner end. A hole is provided at a center and two sides of an upper flange corresponding to the combining element, respectively, so as to correspond to a strip formed wider at an outer end and narrower at an inner end at the two ends for containment. A protrusion is provided on a top end of the strip with a middle portion extended into a nose pad portion to correspond to a hole opened on the combining element provided on top of the lenses, so as to engage the two together when assembled. At the same time, a leg connecting portion at two sides of a frame is provided with a concave portion on a bottom thereof, so as to support the two sides of the lenses when assembled with the lenses, thereby achieving stability with easy containment and engagement when lenses and frame are assembled.

DETAILED DESCRIPTION OF THE EMBODIMENT

Figure 1:
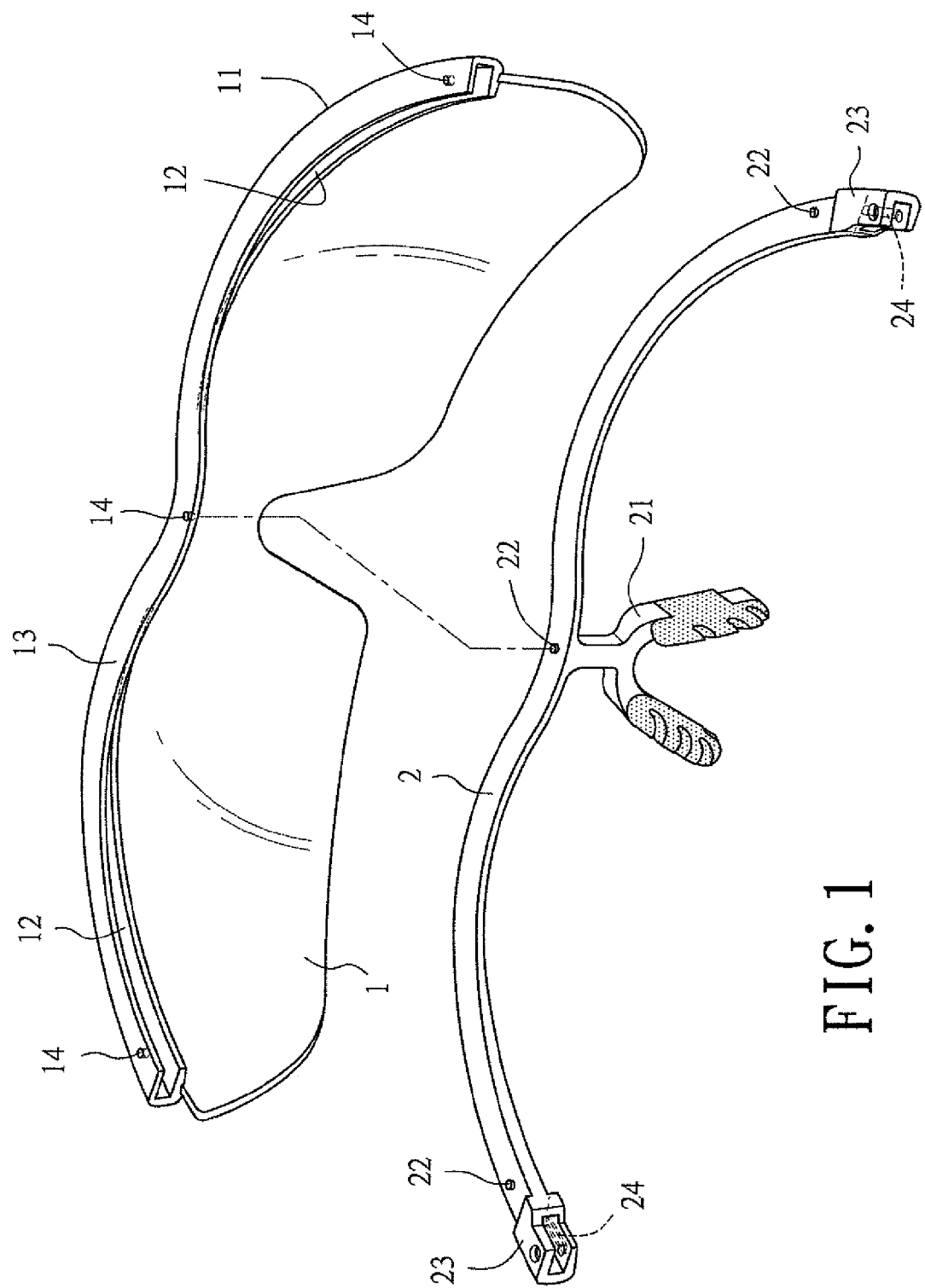
FIG. 1 is a exploded view of eyeglass lenses and frame in accordance with the present invention.

Refer to FIG. 1, which illustrates a fixing structure for lenses and frame of eyeglasses. The fixing structure is consisted of styled lenses 1 and a frame 2. Wherein:

A segment of a combining element 11 integrally formed on a top end of styled lenses 1 corresponding to the lenses is concavely provided with a containing groove 12 facing inward. Two sides of the containing groove 12 are provided with a wider distance at the outer end and narrower at the inner end. An opening is formed on a bottom of a middle portion of the combining element 11. A hole 14 is provided at a center and two sides of an upper flange 13 of the combining element 11, respectively.

Frame 2 is in a single strip shape with a nose pad portion 21 integrally formed in the middle portion. Two sides of the frame 2 are formed with a wider distance at the outer end and narrower toward the inner end along the strip. A top end of the frame 2 is provided with a protrusion 22 in relation to the hole 14 opened on the combining portion 11 located on top of the lenses 1. The leg connecting element 23 at the two ends of the frame 2 is provided a concave portion 24 on the bottom thereof.

Figure 2:
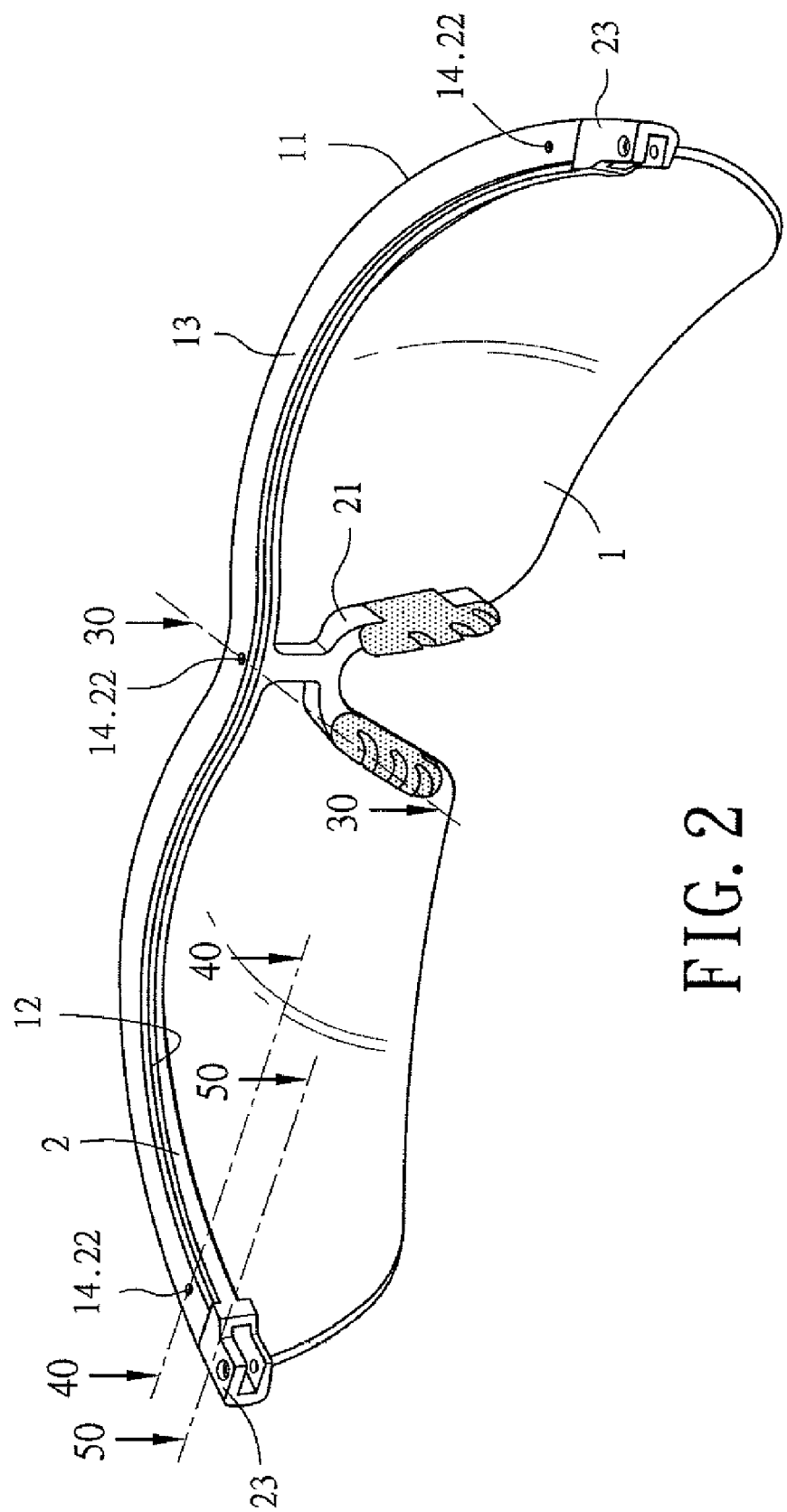
FIG. 2 is an perspective view of the assembled lenses and frame in accordance with the present invention.
Figure 5:
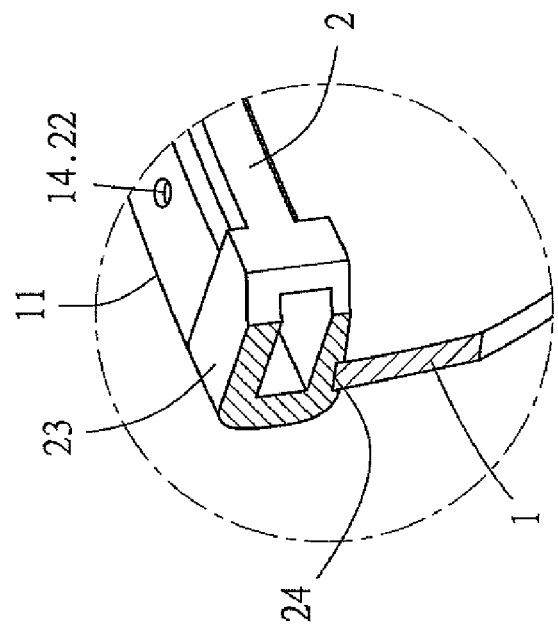
FIG. 5 is a cross-sectional view of taken along 50-50 in FIG. 2.
Figure 4:
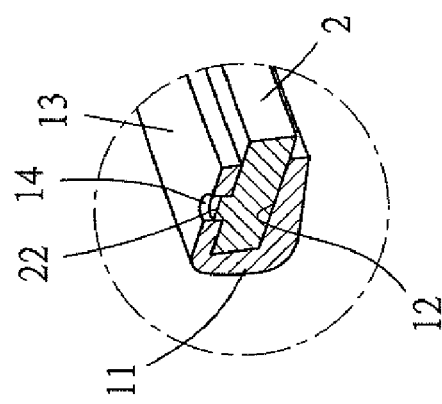
FIG. 4 is a cross-sectional view of taken along 40-40 in FIG. 2.
Figure 3:
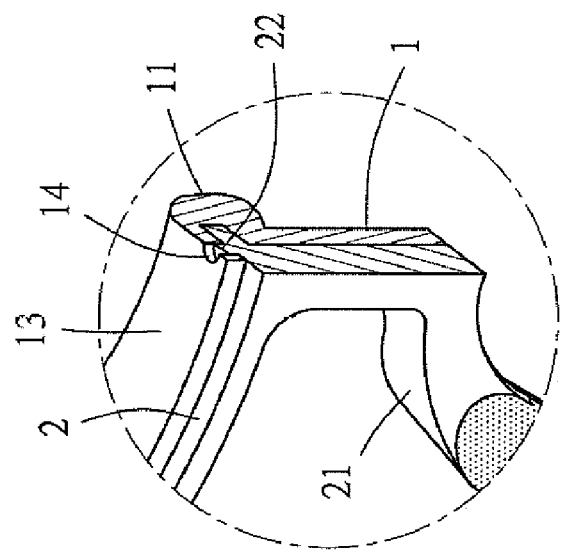
FIG. 3 is a cross-sectional view taken along 30-30 in FIG. 2.

Refer to FIG. 2, which illustrates an assembly of lenses 1 and frame 2. The protrusion 22 at the middle portion of the lenses 2 is first correspondingly engaged with the hole 14 on the combining element 11 on top of the lenses 1, as shown in FIG. 3. The strip on the two sides of the frame 2 is correspondingly contained in the containing groove 12 corresponding to the combining element 11 of the lenses 1. At the same time, the protrusion 22 on the two sides of the frame 2 is correspondingly engaged with the hole 14 at the two sides of the combining portion 11 of the lenses 1, as shown in FIG. 4. Finally, the two outer sides of the lenses 1 are supported at the concave portion 24 on the bottom of the leg connecting element 23 at the two ends of the frame 2, as shown in FIG. 5, such that when lenses 1 and frame 2 are assembled, stable positioning may be achieved with easy containment and engagement.

The aforementioned assembly of lenses and frame may include the following advantages:

1. Lenses and frame are contained and engaged together to form the assembly such that stability can be easily implemented between the two. Even if disassembly is required in the future, it is easy to do and will not destroy the structure of the two elements.

2. Additional process to the single structure of lenses and frame may be facilitated through the easily molded strip and the corresponding containing groove, as well as the protruding and concaving configuration. It is advantageous to easily implement the manufacture thereof.

3. Combination of the single-strip shaped frame and the concavely provided containing groove allows the assembled eyeglasses to have a variety of styling design.

What is claimed is:

1. A fixing structure for lenses and a frame of eyeglasses, said fixing structure consisted of said frame integrally formed with a nose pad portion at a middle portion and styled lenses, characterized in that a combining element integrally formed on a top of said styled lenses is concavely provided with a containing groove facing inwardly at a segment corresponding to said styled lenses, two sides of said containing groove are wider at an outer end and narrower at an inner end, meanwhile on a bottom of a middle portion of said combining element is formed with an opening to correspond to a hole at a center, and two sides of an upper flange of said combining element, respectively; a strip corresponding to said frame on two sides with a wider distance on an outer end and narrower in a center portion thereof is contained, in order to facilitate a containment of said strip formed at said two ends of said frame with said wider distance at said outer end and said narrower distance at said inner end, a protrusion is provided corresponding to said hole opened on said combining element on top of said lenses such that when assembling, said protrusion may be engaged with said hole to combine said lenses and said frame integrally; a concave portion is provided on a bottom of a leg connecting element at said two sides of said frame, so as to support said two sides of said frame when assembled, thereby achieving stability by easy containment and engagement when said lenses and said frame are assembled.

* * * * *